Nov. 7, 1950     G. A. NOLL     2,529,098
PIPE COUPLING
Filed March 27, 1946
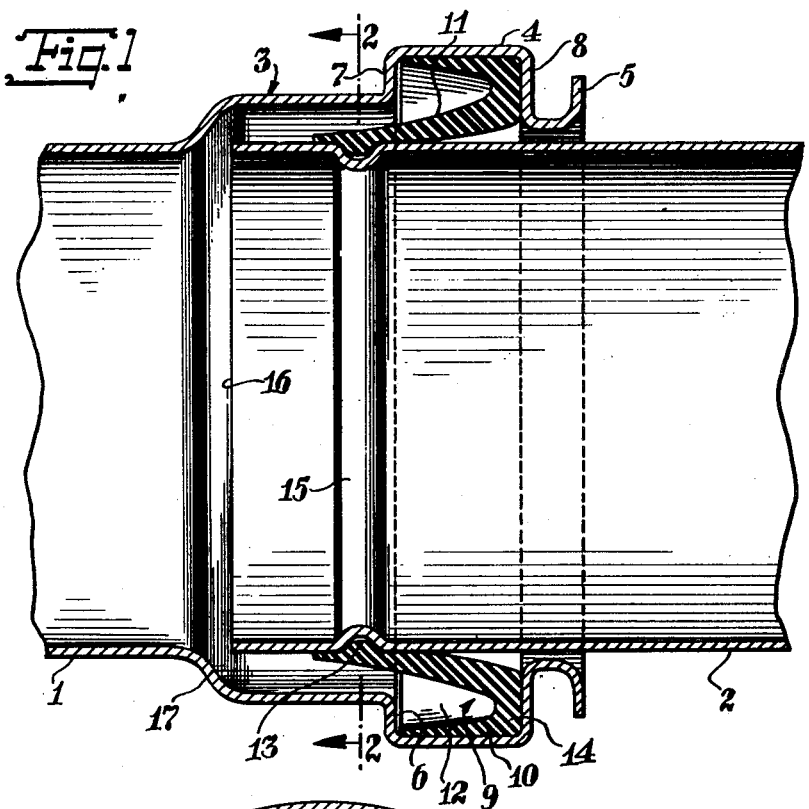
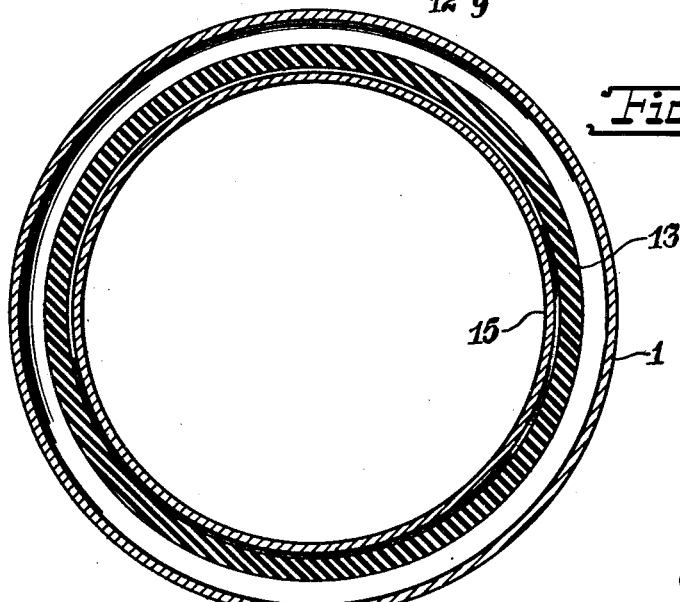
INVENTOR
GEORGE A. NOLL
BY
ATTORNEY Patented Nov. 7, 1950

2,529,098

UNITED STATES PATENT OFFICE 2,529,098

PIPE COUPLING

George A. Noll, Lake Alfred, Fla.

Application March 27, 1946, Serial No. 657,501

2 Claims. (Cl. 285—163)

This invention relates to couplings or joints for pipes and is especially suitable for joining the sections of movable pipe used for irrigation.

A primary object of my invention is to provide a simple and inexpensive joint which is easily and quickly assembled and taken apart.

Other objects are to provide a joint which is automatically progressively tightened by increasing fluid pressure, which offers practically no resistance to the flow of water through the pipe and in which the only part subject to wear is a cheap and easily replaced gasket.

A further object is to provide such a joint that eliminates the necessity for the use of screws, bolts or any kind of tool or clamping device to lock the pipe sections together.

Other advantages and objects of the invention will be apparent from the description thereof to follow taken in connection with the accompanying drawing in which—

Figure 1 is a longitudinal sectional view showing two sections of pipe joined by a coupling embodying my invention.

Figure 2 is a cross-sectional view taken on the plane of the line 2—2 of Figure 1.

In the drawing, the reference numerals 1 and 2 designate two sections of pipe to be joined. Section 1 is provided with an enlarged outwardly flaring end portion 3, which end has an annular bulged-out portion 4 and terminates in a constricted outwardly curved free end or throat 5 The bulged-out portion 4 provides an interior circumferential groove 6 with shoulders 7 and 8 at its ends.

A resilient gasket 9, preferably of rubber and substantially V-shaped in cross-section is seated in groove 6 before the two pipe sections are assembled. The gasket is formed with an outer wall 10 and an inwardly flaring wall or skirt 11, leaving an annular space 12 between said walls. The wall 10 snugly engages the wall of the groove and tapers to a thin free edge engaging the shoulder 7 and the skirt 11 flares inwardly into the pipe section 1 and tapers to a thin free edge. Adjacent its free edge, the skirt is formed with an annular inwardly extending rib 13. The portion of the gasket connecting the outer and inner walls is thickened as at 14 and seats against the shoulder 8.

The diameter of the pipe section 2 is less than the diameter of the throat portion 5 but is slightly greater than the diameter of the opening in the skirt 11 at its free end. The section 2 is formed with an annular exterior circumferential groove 15 at a point remote from its end 16, and the telescoping of the adjacent ends of said pipe sections and the insertion of the end of section 2 into and through the skirt 11 causes said skirt to flex at its inner free end and causes the rib 13 to slip into the groove 15 thereby interlocking the pipe sections together and providing a tight seal where the skirt frictionally engages the surface of the section 2.

When the sections are in this interlocking and sealing position, the inner end 16 of section 2 is positioned close to the shoulder 17 at the inner end of the enlarged portion 3 of section 1, and the wall of said inner end is in alignment with the straight cylindrical wall of section 1 so that there is practically no obstruction to the flow of water through the pipe. The water passing around the inner end 16 of section 2 will impinge against the outer wall of skirt 11 and press said skirt against the outer surface of section 2 forcing the rib 13 into the groove 15 and jamming the thickened portion 14 of the gasket against the shoulder 8 and the inner wall 10 of the gasket against the wall of the annular groove 6.

It will be seen that my improved joint may be assembled and made water tight simply by pushing the end of section 2 through the opening in skirt 11 until the rib 13 slips into the groove 15 in said pipe section and that the sections may be separated by simply pulling out section 2 when the fluid pressure is removed from the gasket. The shape of the gasket 9 with its inwardly flaring skirt 11 and rib 13 not only tightens the joint by friction when the section 2 is inserted through said gasket and causes said gasket to be progressively pressed tighter as the fluid pressure in the pipe is increased, but retains the gasket in the groove 6 when the pipe section 2 is removed so that the gasket need not be handled separately and is not likely to be lost.

The joint is simple and inexpensive to construct, has no parts subject to wear except the cheap and easily replaced gasket and can be easily cleaned merely by washing or even wiping off. Furthermore, the space between the throat 5 and section 2 permits some angularity between sections of the pipe line to allow it to conform to irregularities in the ground surfaces and such angularity does not impair its tightness.

Changes in details of construction might be made without departing from the principle of the invention and I desire to be limited only by the state of the prior art and the appended claims.

What I claim is:

1. A gasket for a pipe joint comprising an annular body substantially V-shaped in cross-section having flaring walls, one of which tapers to a thin edge and has an inwardly extending circumferential rib on its inner surface adjacent said thin edge.

2. A pipe joint comprising inner and outer telescoping pipe sections, the outer section having an enlarged end portion formed with an interior circumferential groove, the inner section having a recess in its outer surface adjacent its inner end, a resilient gasket approximately V-shaped in cross-section seated in the said circumferential groove of said outer section and having inwardly extending walls the inner edge portion of one of which is spaced from the inner surface of the outer pipe section and is adapted to frictionally engage the inner telescoped end of said inner section and is compressible into said recess by fluid pressure passing through said joint so as to provide a fluid-tight joint between said pipe sections and to interlock the pipe sections together.

GEORGE A. NOLL.

REFERENCES CITED

The following references are of record in the file of this patent:

UNITED STATES PATENTS

| Number | Name | Date |
|---|---|---|
| 343,138 | McHugh | June 1, 1886 |
| 2,259,453 | Beyer et al. | Oct. 21, 1941 |
| 2,278,074 | Hauf | Mar. 31, 1942 |
| 2,355,407 | Wyss | Aug. 8, 1944 |